United States Patent [19]

Zimmer et al.

[11] Patent Number: 4,853,845

[45] Date of Patent: Aug. 1, 1989

[54] DATA PROCESSING APPARATUS FOR TIME-INTERLEAVED EXECUTION OF A PLURALITY OF PROCESSES

[75] Inventors: Günther A. H. Zimmer, Hamburg, Fed. Rep. of Germany; Dirk H. Braune, Paris, France; Cecil H. Kaplinsky, Palo Alto, Calif.

[73] Assignee: U.S. Philips Corporation, New York, N.Y.

[21] Appl. No.: 900,870

[22] Filed: Aug. 27, 1986

[30] Foreign Application Priority Data

Sep. 12, 1985 [DE] Fed. Rep. of Germany ....... 3532481

[51] Int. Cl.⁴ .............................................. G06F 9/40
[52] U.S. Cl. ................................. 364/200; 364/243.3; 364/263; 364/270
[58] Field of Search ... 364/200 MS File, 900 MS File

[56] References Cited

U.S. PATENT DOCUMENTS

| | | | |
|---|---|---|---|
| 4,025,902 | 5/1977 | Nakao et al. | 364/900 |
| 4,124,890 | 11/1978 | Vasenkov et al. | 364/200 |
| 4,197,579 | 4/1980 | Otis, Jr. et al. | 364/200 |
| 4,205,372 | 5/1980 | Gruner | 364/200 |
| 4,247,904 | 1/1981 | Huu et al. | 364/900 |
| 4,274,138 | 6/1981 | Shimokawa | 364/200 |
| 4,342,078 | 7/1982 | Tredennick et al. | 364/200 |
| 4,484,303 | 11/1984 | Provanzano et al. | 364/900 |
| 4,539,635 | 9/1985 | Boddie et al. | 364/200 |

Primary Examiner—Gareth D. Shaw
Assistant Examiner—Debra A. Chun
Attorney, Agent, or Firm—Brian J. Wieghaus

[57] ABSTRACT

Because a customary data processing apparatus consisting of a program control section, an arithmetic and logic element and a data memory, also referred to as a microprocessor or microcontroller when integrated on a semiconductor chip, is temporarily not loaded by a control function in many applications, it is desirable to perform a plurality of such slow control functions by means of one apparatus. In order to achieve this as effectively as possible, in accordance with the invention there are added a sequencer and an address memory which is controlled by the sequencer and which takes up each time the next instruction address of a given control function or process which is each time associated with a sequence control signal. For the arithmetic and logic element there is preferably provided a buffer memory which is also controlled by the sequencer. As a result, several processes can be simply performed in a time-interleaved manner; a pipe-line structure can be formed by utilizing further intermediate memories so that the individual elements of the apparatus can be very effectively used.

29 Claims, 4 Drawing Sheets

Fig.1

|  CT0  |  CT1  |  CT2  |  CT3  |
|---|---|---|---|
| F1 |  |  | F4 |
|  | F2 |  | F5 |
|  |  | F3 | F6 |

| F7 | F9 | F11 |  |
|---|---|---|---|
| F8 | F10 | F12 |  |

Fig.2

| C0 | C1 | C2 | C3 | C4 | C5 |
|---|---|---|---|---|---|
|  | F21 | F22 | | | |
| F23 | | | | | F24 |

|  | F25 |  | F27 |
|---|---|---|---|
|  | F26 | | F28 |

|  |  | F32 | F34 |  |
|---|---|---|---|---|
| F30 | F31 | F33 | F35 |  |

DATA PROCESSING APPARATUS FOR TIME-INTERLEAVED EXECUTION OF A PLURALITY OF PROCESSES

BACKGROUND TO THE INVENTION

The invention relates to an integrated circuit data processing apparatus, including:
- an instruction memory which is followed by an instruction register for storing of instruction words;
- a program sequencer for addressing the instruction memory for cyclically addressing, selectively in dependence of condition signals, a next instruction word address, an arithmetic and logic element for combining, under control of an information contained in the instruction register, two data words applied;
- a buffer memory which is associated with the arithmetic and logic element for storing a combination result and/or a data word to be applied to the arithmetic and logic element;
- a data memory being addressed by further information contained in the instruction word and whose data inputs and outputs are connected to an output and an input, respectively, of the arithmetic and logic element;
- a connection for communication to an environment external to the data processing apparatus; and
- a clock generator for cyclically repeatedly generating a sequence of mutually time-shifted clock signals.

SELECTED STATE OF THE ART

Different types of data processing apparatus of this kind are known, for example the type MAB 8041A or the type family MAB 8400 from the 1984 Data Handbook on 8-bit single-chip microcontrollers from VALVO Hamburg, Germany. Apparatus of this kind are designed to perform only one function, that is to say one process at a time. A process is to be understood to mean herein a number of elementary operations which are chained by a sequencer and which are performed on information stored in the memory assigned to the process in question. The state of a process can be indicated by way of a state diagram. Program branches can be initiated, for example by external condition signals or interrupt signals, and can be used to execute several different functions in succession, even in a rapid succession. However, a substantially time-parallel execution of several different processes is not possible or possible only when extremely elaborate programs are used. This makes the execution of the processes so slow that the speed will be insufficient in many practical cases. Therefore, in such cases a plurality of such apparatus is used, one apparatus being assigned to each process. However, this requires a substantially larger number of circuit elements.

SUMMARY OF THE INVENTION AND SELECTED ADVANTAGES

Therefore, it is an object of the invention to provide a data processing apparatus of the kind set forth which enables the fast execution of several programs quasi-parallel in time while using only limited additional means.

This object is achieved in accordance with the invention in that for a time-interleaved, quasi-parallel execution of a plurality of processes there is provided a sequencer for cyclically generating successive, different sequence control signals, a respective different sequence control signal being assigned to each one of a plurality of processes to be executed in parallel. The program sequencer includes an address memory for storing a number of instruction memory addresses which is determined by the number of different sequence signals and which is addressed by the sequence control signals. The output of the address memory is connected to the address input of the instruction memory, as well as an address generator which forms, under control of the current instruction memory address and/or condition signals and/or the contents of the respective addressed memory location of the data memory, the next instruction memory address for the associated process. The output of the instruction memory is connected to the data input of the address memory and the buffer memory has a number of memory locations which is determined by the number of different sequence control signals and which are addressed by the sequence control signals. From input signals of the connection to the environment there are derived, via connection circuits which are controlled by sequence control signals, condition signals and/or data signals which are applied to a data input of the data memory. Output signals of the connection to the environment are derived, via connection circuits which are controlled by sequence control signals, from the instruction word and/or from a data word appearing on a data output of the data memory.

Thus, only limited additional means will be required, that is to say, first the sequencer, which may have a simple construction, as well as a multiple instruction address register, an extension of the buffer memory, and the connection circuits for the inputs and outputs, it being assumed that at least a part of the control lines to and from the environment are different for different processes. However, notably, when the input signals generating condition signals or the output signals derived from the instruction word comprise only very few signals or even only one signal for each process, these signals can also be applied or derived in parallel without utilizing connection circuits; for each process only the condition signals assigned thereto are then taken into account in the address generator, the other signals being masked and the instruction word having a corresponding width.

As a result of the steps taken in accordance with the invention, a plurality of processes can be executed quasi-parallel in time, i.e. the instructions of the individual processes can be interleaved in an arbitrary time sequence without special steps being required for the respective programs of the individual processes. Only the speed of execution of the individual processes in this quasi-parallel in time set-up decreases as a function of the number of processes executed simultaneously. The time interleaving of the execution of the processes is realized, for example on the basis of individual instructions, be it that the individual instructions of the individual processes do not necessarily succeed one another strictly cyclically; the instructions of a particular process may also be addressed with a higher or lower frequency than the instructions of other processes, e.g. depending on the different time conditions of the individual processes. This is achieved by a corresponding construction of the sequencer, without additional means being required.

FURTHER ASPECTS OF THE INVENTION

The execution of each instruction of the instruction memory requires a number of processing steps which are successively performed. The speed of execution is determined essentially by the clock frequency of the clock generator which is adapted to the processing speed of the individual elements of the data processing apparatus. In order to accelerate the execution of the individual processes without modification of the processing speed, an embodiment in accordance with the invention has the output of the address memory also connected to the input of an instruction address register, the output of the sequencer also being connected to the input of a sequence control register, the address memory being addressed for reading by the sequence control signal on the output of the sequencer, being addressed the address memory being addressed as well as the buffer memory and the connection circuit being addressed for writing by the sequence control signal on the output of the sequence control register, control clock inputs of the instruction register, of the instruction address register, of the address memory, of the sequence control register, of the buffer memory and of the data memory being connected to clock outputs of the clock generator in such a manner that the sequence consisting of:

generating the sequence control signals,
addressing the address memory and reading a new address for the instruction memory,
reading the addressed instruction word, and
storing the instruction word in the instruction register,
the new address in the instruction address register, and
the sequence control signal in the sequence control register,
is performed in parallel with the sequence composed of: reading the data memory location addressed by the instruction register and the buffer memory location addressed by the sequence control register,
processing the data read as well as generating the new instruction memory address in the address generator in dependence of the contents of the instruction address register and/or the other signals, and
storing the combination result in the data memory or in the buffer memory and storing the new instruction memory address in the address memory, so that each time at least two processes are executed essentially in parallel. Thus, a so-called pipe-line structure is formed whereby the speed of execution of the individual processes is essentially doubled, without the processing speed being increased. This requires only the addition of simple buffer registers in a given, limited number of positions, so that the execution of the next instruction can already be started before completion of the execution of the preceding instruction. However, using such time-interleaving of the individual instructions, it is often not possible to execute a plurality of instructions of the same process in direct succession; however, this forms hardly ever a real restriction in practice.

The sequencer may be constructed in various ways. In the simplest form it may be constructed as a counter, the counter positions forming the sequence control signals. However, this is a rather inflexible construction. For flexible adaptation to the execution of different processes or combinations of processes, the sequencer is formed by a sequence counter whose capacity equals at least the maximum number of different sequence control signals and includes a sequence control memory which is addressed by the sequence counter and which contains different sequence control signals in successive memory locations. Due to the use of a sequencer memory, the sequence of the individual processes can be chosen arbitrarily to a high degree, notably when the sequence counter has a capacity which is large compared to the number of processes to be executed quasi-parallel in time, as will be explained hereinafter.

The above construction of the sequencer necessitates additional steps for generating each time the next sequence control signal, so that the execution of an instruction is slightly prolonged further. In order to avoid such a prolongation in the described time-interleaved execution of successive instructions according to the pipe-line principle, a further embodiment in accordance with the invention is characterized in that the sequencer includes a further sequence control register which outputs the sequence control signals, control clock inputs of the sequence counter, of the sequence memory and of the further sequence control register being connected to clock outputs of the clock generator so that the sequence composed of:

advancing the sequence counter,
reading the sequence control memory,
writing the sequence control signal read into the further sequence control register,
is performed essentially in parallel with the other two sequences. Thus, the processing steps of each instruction are sub-divided into three groups which are executed at three levels in a time-interleaved manner.

As has already been explained in order to increase the flexibility the capacity of the sequence counter is preferably greater than the number of processes to be simultaneously executed. In a further embodiment in accordance with the invention, a dynamic adaptation to changing circumstances can be achieved in that the capacity of the sequence counter can be adjusted by means of control signals. These control signals may be generated in the data processing apparatus or may originate from the environment. Similarly, another dynamic adaptation to changing circumstances is possible in that the contents of the sequence control memory can be modified. This can again be realized by means of signals generated either within the data processing apparatus or originating from the environment.

The processing results formed by the data processing apparatus, notably the output values of the arithmetic and logic element, are essentially present in the data memory. In order to enable the processing of these results by apparatus which are connected via the connection extending from the data processing apparatus to the environment, further processing or conversion will often be required. Such a conversion can be simply realized in a further embodiment in accordance with the invention in that there is provided a first read-only memory which is addressed by the current address of the instruction memory or the address stored in the instruction address memory, by the data read from the data memory, and by at least one condition signal, and whose data output can be connected, via a first switch which is controlled by the instruction word, to the input of the buffer memory and/or the data memory instead of the output of the arithmetic and logic element. The converted processing results thus obtained will again be present in the data memory either directly or possibly after a next step and can be output via the connection from the data processing apparatus to the environment.

Many processing steps require given invariant data words or constant masks words for processing results. In order to enable fast access to such constant data or masks, a further embodiment in accordance with the invention is characterized in that there is provided a second read-only memory which is addressed by the current address of the instruction memory or the address stored in the instruction address memory, and by at least one condition signal, and whose data output can be connected, via a second switch which is controlled by the instruction word, to an input of the arithmetic and logic element instead of the buffer memory. Data words read from the data memory can thus be simply combined with constant values in the arithmetic and logic element. The results thus obtained can again be stored in the data memory for output to the environment.

Thus, the time-interleaved execution of two or three instructions in different elements of the data processing apparatus requires registers which are controlled by appropriate clock signals. An even more reliable time-interleaved execution of a plurality of instructions can be realized in a further embodiment in accordance with the invention when the two inputs of the arithmetic and logic element as well as the inputs for data signals and/or condition signals of the address generator, and possibly of the first read-only memory, are all preceded by a buffer register, all such buffer registers taking over the applied data immediately after the reading of the data memory or the buffer memory. This is attractive notably for given technical realizations of the data processing apparatus as an integrated circuit, for example in dynamic MOS technology, because an accurately defined execution time will then be available for individual processing steps.

Thus, at least a part of the condition signals is derived from input signals on the connection to the environment. A further condition signal can be derived from a control output of the arithmetic and logic element, the control output presenting several bits which signal, for example, a carry, zero crossing or change of sign of the combination result. In order to enable such combination results, appearing on the control output, to be processed each time in the next instruction of the same process, wherebetween usually several instructions of other processes are executed, in a further embodiment in accordance with the invention a control output (carry, zero crossing or change of sign) of the arithmetic and logic element is followed by a flag memory which has a number of memory locations which is also determined by the number of different sequence control signals and which are addressed by the sequence control signals, the output of the flag memory supplying at least one condition signal. Thus, the construction of this flag memory is substantially the same as that of the buffer memory and it is controlled in the same way.

The connection circuits for the connection to the environment serve to ensure that, during the processing of an instruction of a given process, the appropriate input signals are applied and the appropriate output signals are output. In order to realize this in a simple manner, a further embodiment in accordance with the invention is characterized in that the connection circuit for the condition signals is formed by a multiple multiplexer which is controlled by the sequence control signals and which derives at least some of the condition signals for at least some sequence control signals from signals on input lines of one of a plurality of groups of input lines associating each group with a different sequence control signal. The connection circuit for the instruction word being a multiple demultiplexer which is controlled by the sequence control signals and which connects at least some outputs of the instruction memory register to output lines of one of a plurality of groups of output lines associated each time with a different sequence control signal. Thus, only as many condition signals need be processed simultaneously as there can appear at the most in a process, and the length of the instruction word may also remain small, because the part wherefrom the output signals to the environment are derived is governed only by the process involving the largest number of output signals. The connection circuits for the input signals can be preceded by storage circuits such as flip-flops in a customary manner, said circuits directly taking up signals arriving from the environment and prolonging these signals in time, so that they are still available when they are to be processed, this preventing the loss of brief input signals. Similarly, the connection circuits for the output signals may be followed by storage circuits which are set, for example by a given output signal and which remain in that state until they are reset by a further output signal. Thus, output signals of long duration can be generated in order to bridge notably the intervals during which other processes are executed.

Time adaptation is also essential in the case of external accessing of the data memory. Therefore, the connection circuit associated with the data memory preferably accesses the data memory only by means of control signals which are supplied from outside the apparatus and which are synchronized, using synchronization circuits in the connection circuit, with the clock signals of the clock generator and with sequence control signals. At least one predetermined sequence control signal inhibits the writing of data from the arithmetic and logic element, or possibly from the first read-only memory, into the data memory. The signals or data arriving from the environment or destined for the environment may thus be completely asynchronous again with respect to the clock signals from the clock generator. The sequence control signal or signals inhibiting the writing of data are preferably cyclically, uniformly repeated by the sequencer, thus representing a process during which, however, no actual functions are performed, but only the data memory is prepared for a write access by the environment and possibly also for a read access.

Because long intervals may occur between the sequence control signals for access to the data memory, intermediate storage of notably a plurality of data to be written from the environment is advantageous. Therefore, a further embodiment in accordance with the invention is characterized in that the synchronization circuits include a buffer memory which is preferably constructed as a FIFO and which takes over the data to be written which are applied to the connection circuit from the environment and the associated addresses for supplying the data memory under the control of the clock signals and the sequence control signals. Thus, a plurality of data to be written can also be successively applied from the environment without it being necessary to wait for the actual write operation in the data memory.

In order to avoid the occurrence of a waiting period similar to that in the case of writing, to be prevented only by means of buffer memories, when data are read from the data memory for output to the environment, the data memory is preferably constructed as a dual-access memory wherefrom data can be read at two arbitrary addresses, applied via separate address inputs, in a time-independent manner for output on separate data outputs. Memories of this kind are known per se and have a simple construction, notably when their capacity is not too large. For given embodiments of the memory, reading takes place only in a given cycle which is preferably controlled by the clock signals of the clock generator, so that synchronization of the access signals supplied from the environment will be required. However, the reading of data will in any case be performed within a cycle of the clock signals of the clock generator.

The data processing apparatus in accordance with the invention can be used for many purposes. A particularly attractive application is the control of input/output apparatus operations for a higher-order data processing system, in which case the data processing apparatus in accordance with the invention forms an intelligent interface which substantially frees the data processing system from lower-order control functions. A further embodiment in accordance with the invention, therefore, is characterized in that the for the quasi-simultaneous control of a plurality of input/output apparatus operations for a higher-order data processing system, the data processing system is connected to the connection circuit for the data memory, the input/output apparatus being connected to the connection circuits for the condition signals or the instruction word. The control of input/output apparatus generally requires only a comparatively small number of signals, while the connection to the higher-order data processing system is more complex; this aspect is taken into account by the bit-parallel connection to the data memory. Thus, the data processing apparatus in accordance with the invention is connected as an intelligent interface between the connection circuit connected to the higher-order data processing system and the connection circuits connected to the input/output apparatus. The input/output apparatus operations may also form purely serial data connections, the data processing apparatus in accordance with the invention then generating the outgoing serial data and processing the serial data received. Moreover, parallel to the serial data interfaces, timer functions can also be quasi-simultaneously performed in time-interleaved form.

A signal arriving from an input/output apparatus is processed and the result is applied to the higher-order data processing system. This transfer can take place in that the higher-order data processing system periodically accesses the data memory and reads a given location thereof. However, for further relief of the higher-order data processing system there is preferably provided a set of registers including a number of control registers which correspond to the number of different sequence control signals, said control registers being accessible by the higher-order data processing system and each register being associated with another sequence control signal, an arithmetic and logic circuit generating a control signal, notably an interrupt signal, for the higher-order data processing system when, during a given sequence control signal, the associated control register and at the same time a predetermined output of the instruction register carry predetermined values. Thus, the customary interrupt signals are simply generated for such data processing systems.

The higher-order data processing system can indicate that it cannot process interrupt signals for the time being by writing an appropriate signal into the associated control register. The generating of a given interrupt signal can thus be inhibited or postponed to a later instant when another signal value is written into the control register again.

The control of the data processing apparatus in accordance with the invention by the higher-order data processing system via the accessing of the data memory may often have given drawbacks; for example, for given cases the procedure is somewhat laborious and possibly also too slow. For simple and fast access to the data processing apparatus in accordance with the invention, therefore, the set of registers preferably also includes a number of stop registers which correspond to the number of different sequence control signals, said stop registers being accessible by the higher-order data processing system and being associated with a respective sequence control signal, an arithmetic and logic circuit generating a blocking signal which inhibits the writing of data in all memories when the associated stop register and a predetermined output of the instruction register simultaneously carry predetermined values during a given sequence control signal. Thus, when modification of the contents of all memories is precluded during a given sequence control signal, that is to say during a given process, the same instruction will be executed over and over again, however, without the results of this instruction being taken into account. The relevant process is thus stand-by until the higher-order data processing system writes another signal value into the relevant stop register. On the other hand an input/output process may not be interrupted at every arbitrary point, for example a serial data connection fed by several other apparatus, which may also transmit data, may not be maintained at one of the two binary signal values (for example, "low"). Then stopping or holding control signal of a process is logically combined with the signal identifying such "forbidden" point, so that holding can occur only for given instructions.

BRIEF DESCRIPTION OF THE FIGURES

Embodiments in accordance with the invention will be described in detail hereinafter with reference to the drawing. Therein.

OVERALL DESCRIPTION OF A PREFERRED EMBODIMENT

Figure 1:
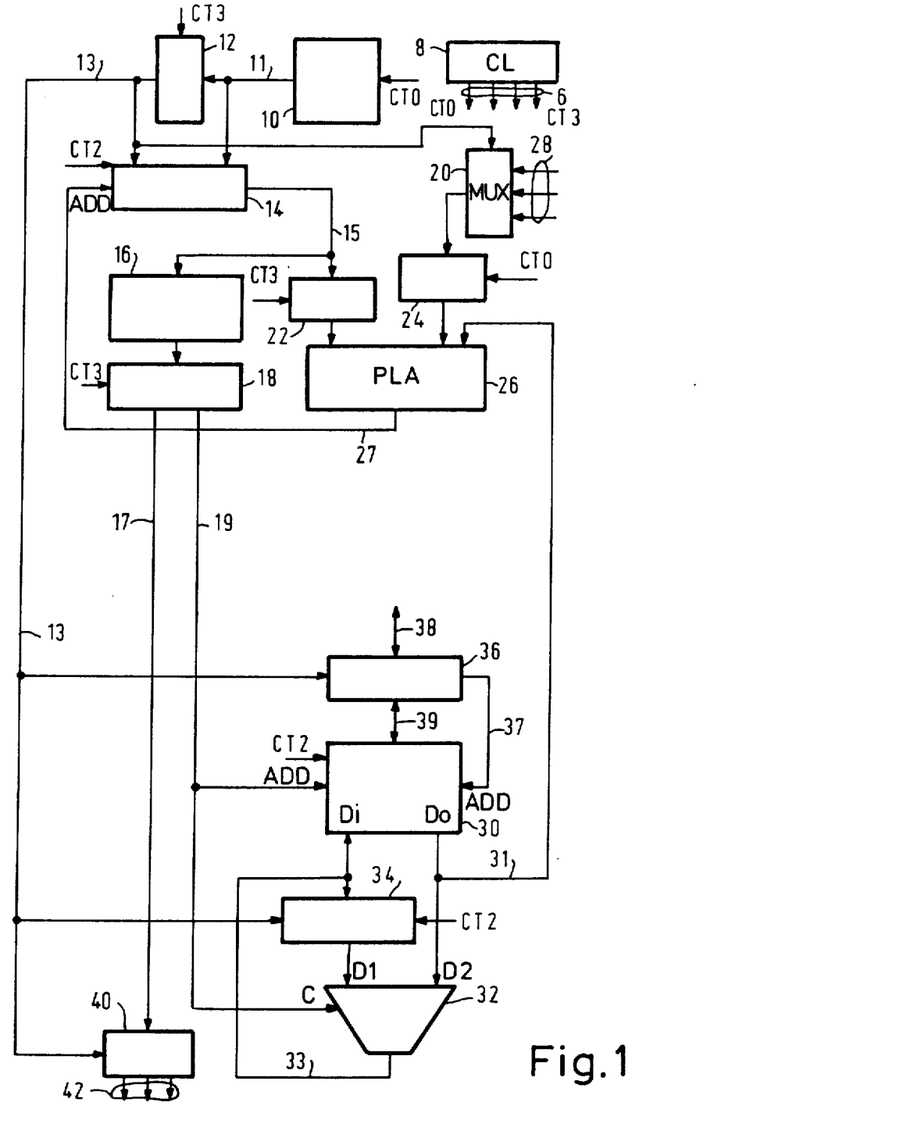
FIG. 1 is a simplified block diagram of a data processing apparatus in accordance with the invention.

The data processing apparatus shown in FIG. 1 includes a number of known and customarily used elements, notably an instruction memory 16 which is in this case followed by a register 18 which stores the instruction words read from the instruction memory 16 until a new instruction word is read. The instruction memory 16 is addressed by an assembly formed by elements 22, 24 and 26 which generate each time the next address of the instruction memory 16 on a line 27, said address being applied to the address input thereof via an element 14 and a line 15. The latter elements will be described in detail hereinafter. It is to be noted that the connections 15 and 27 as well as the majority of the other connections in FIG. 1 actually consist of a number of separate, parallel lines which are shown as a single connection only for the sake of simplicity. This also holds good for the FIGS. 3 and 5.

There is also provided an arithmetic and logic element 32 whose non-bus output connection 33 is connected to the data input Di of a data memory 30 as well as to the data input of a buffer memory 34. The arithmetic and logic element 32 logically or arithmetically combines two multi-bit data words which are supplied by the buffer memory 34 and, via connection 31, by the data memory 30 under the control of information contained in the instruction word supplied by the instruction register 18 via a connection 19. To the instruction register 18 there is also connected a connection 17, the two connections 17 and 19 conducting different parts of each instruction word. The arithmetic and logic element 32 is controlled in a customary manner by means of only a few bits of the part of the instruction word supplied via the connection 19, the other bits of this part addressing the data memory 30. Moreover, the data memory 30 is controlled thereby, regardless of for either reading or writing data. The data stored is unconditionally read in reaction to each addressing operation.

It is to be noted that in the apparatus shown in FIG. 1 the connections 17 and 19, carrying instruction words or parts thereof, and further the connections 31 and 33, conducting data words, are formed by separate dedicated connections; this is contrary to many known data processing apparatus in which instructions and data are all conducted via the same internal data bus. As used hereinafter, the term "dedicated connection" refers to a separate communication channel connecting a single output of an element of the apparatus to a single input of another element of the apparatus. In the apparatus shown in FIG. 1, a data section and an instruction section can be distinguished as a result of this separation.

The reference numeral 8 denotes a clock generator which generates mutually shifted clock signals in a cyclically repeated manner on a number of outputs 6. For the present embodiment four different clock signals are assumed, denoted by the reference numerals CTO to CT3 in a time sequence. These clock signals are applied notably to different memory elements of the apparatus. The number of different clock signals and their exact positions depend at least partly on the realization of the elements, for example on whether the complete apparatus is constructed in static CMOS or in dynamic NMOS elements, so that the following explanations are given merely by way of example. In any case, a sequence which includes all clock signals each time represents a cycle.

The apparatus shown in FIG. 1 is suitable for the quasi-parallel time-interleaved execution of a plurality of processes. To this end there is provided a sequencer 10 which successively generates different sequence control signals on a connection 11, each sequence control signal being associated with a given process. The sequence control signals are preferably formed by multibit data words, the number of bits corresponding, for example to the maximum number of processes simultaneously executable. However, this necessitates a large number of control lines in connection 11 and hence also in connection 13. In order to reduce the number of lines, the sequence control signals may also be encoded in binary form. In the simplest case, the sequencer 10 may consist of a counter which successively repeats all sequence control signals cyclically. The sequence of the sequence control signals, and hence the time interleaving of the individual processes, however, is thus fixed. A more flexible sequencer construction will be described hereinafter.

Each clock signal CTO drives the sequencer 10 to produce a new sequence control signal on line 11. The next following clock signal CT3 drives control register 12 to store this sequence control signal. Thus, the sequence control signal appearing on the connection 11 at the beginning of a cycle appears on the connection 13 at the end of the cycle. The connections 11 and 13 feed the address inputs of an address memory 14 which for each separate process contains the address in instruction memory 16 of the associated next instruction. This address had been supplied by programmable logic array 26, via connection 27. The sequence control signal on connection 11 addresses the instruction which after reading, via connection 15 addresses instruction memory 16. The sequence control signal on connection 13 addresses address memory 14 for under control of clock signal CT2 controlling a write operation of an instruction address appearing on connection 27. Element 26 is a gate device, that is addressed by instruction address register 22, by register 24, and by at least a part of the bits of the data word appearing on line 31. From a given input signal combination, the device 26 generates a data word permanently associated thereto. Instruction address register 22 stores the current instruction memory address present on line 15. Register 24 stores the signal presented via lines 28 to multiplexer 20, from the environment; these lines represent at least one input of the data processing apparatus shown in FIG. 1 and originate, for example from a plurality of external peripheral apparatus such as input or output apparatus; they carry, for example, serial data or status signals. These signals are processed in that they influence the formation of the next instruction address. Multiplexer 20 is controlled by the sequence control signals on the connection 13 and connects, in dependence thereof, one of the lines 28 or a group of lines to the register 24. The data word on line 31 is read from data memory 30. Similarly to the input lines 28 the lines 42 form an output of the data processing apparatus shown in FIG. 1; these lines receive, via the connection 17, signals which originate from part of the outputs of the instruction register 18, via a demultiplexer 40 which is also controlled by the sequence control signals on the connection 13. The lines 42 are connected, for example again to peripheral apparatus, and the signals transmitted thereon are, for example serial data or control signals. There is also provided a further connection 38 to the environment which applies data, via an interface circuit or connection circuit 36, to the data memory 30 via the data connection 39 or which reads data from this data memory. The addresses of the data to be read or written are then applied to the data memory 30 via the connection 37. The connection circuit 36 is also controlled by the sequence control signals on the connection 13 as will be explained hereinafter.

The connection 38 may be connected, for example to a higher-order data processing system for which the apparatus shown in FIG. 1 represents an intelligent interface control device for connecting to peripheral apparatus.

DESCRIPTION OF THE TIME-SEQUENTIAL OPERATION

The execution in time of the processing operations in the apparatus shown in FIG. 1 will now be described in detail with reference to FIG. 2. Therein, the function steps executed in response to the respective clock signals CTO to CT3 are showing two separate blocks. These are associated with different control sequence for the same clock signal, that is to say with different processes. Alternatively, they may be executed successively in relation to the same control sequence.

The time-sequential operation for the latter situation will be described hereinafter, that is to say in relation to the complete execution of an instruction.

In response to the first clock signal CTO of a cycle, the sequencer 10 generates a sequence control signal in function step F1. This signal appears on connection 11 at the end of this clock signal period, and remains thereon until the next sequence control signal is generated. In reaction to the next clock signal CT1 in step F2, the memory location in the address memory 14 is addressed by this sequence control signal and can thus be read. At the end of the period of CT1 the address of the next instruction in the instruction memory 16 will be present on the connection 15. In reaction to the clock signal CT2, the relevant instruction can then be read from the instruction memory 16 in step F3. This instruction will be available on the output of memory 16 at the end of this period.

At the beginning of the clock signal CT3, therefore, the new sequence control signal will be present at the input of the sequence control register 12 in order to be written therein during function step F4. Furthermore the new instruction address will be available on the input of the instruction address register 22 in order to be written therein by the clock signal CT3 during function step F5. Finally, on the input of the instruction register 18 the instruction word is available in order to be written by means of the clock signal CT3 during function step F6. The connections 17 and 19 thus carry the instruction to be executed in the process which is determined by the sequence control signal simultaneously present on the connection 13

In reaction to the first clock signal CTO of the next cycle, in step F7 the signal(s) on lines 28 are selected in the multiplexer 20 by the sequence control signal on the connection 13. The line in question is associated with the peripheral apparatus controlled by the process corresponding to the respective sequence control signal. The selected signals are applied to the input of register 24 in which they are stored. At the same time, in function step F8 a data word is read from the address of data memory 30 given by the instruction word part present on the connection 19. This data word is applied, via the connection 31, to the arithmetic and logic element 32 and to the PLA 26. Because the buffer memory 34 is addressed by the sequence control signal on the connection 13, it also outputs the data word present at this address for supply to the other input of the arithmetic and logic element 32. It may be adjusted for a given function by given bits in the part of the instruction word present on the connection 19 and the data word generated by the arithmetic and logic element 32 will appear on the connection 33 at the end of the clock signal CT1 in step F10. At the same time in step F9 the next instruction address generated in the PLA 26 for this process will appear on the connection 27, that is to say the instruction address for this sequence control signal. In reaction to the next clock signal CT2, in function step F11 the new instruction address is stored in the address memory 14 at the address associated with the sequence control signal, that is to say the address assigned to the current process.

Furthermore, in step F12 the data word on the connection 33 is written into the buffer memory 34 at the address determined by the sequence control signal on the connection 13 and possibly also into the data memory 30. This depends on control signals in the instruction word part on the connection 19, the latter write address also being determined by the instruction word part on the connection 19. The execution of an instruction has thus been completed.

In reaction to the clock signal CTO of this cycle, used for executing the steps F7 and F8, however, at the same time the step F1 is executed, that is to say the next sequence control signal is generated; this signal usually belongs to another process for another peripheral apparatus. The further function steps F2 and F3 are executed parallel in time with the function steps F9 and F10 respectively F11 and F12. This illustrates that the registers 12, 18 and 22 can take over their new contents only in reaction to the clock signal CT3, i.e. when the previously generated address or the previously generated data word has been stored in the function steps F11 and F12.

Figure 2:
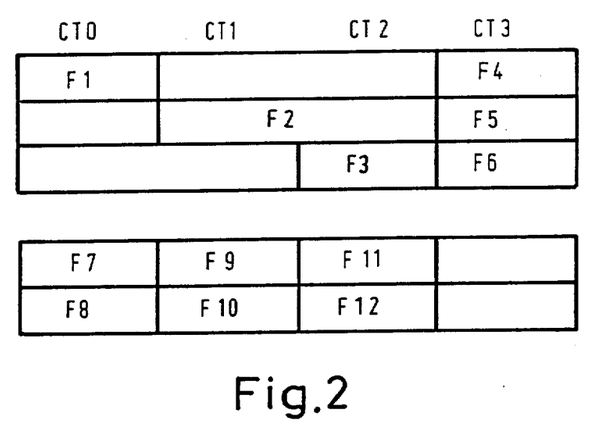
FIG. 2 is a diagram illustrating the time sequence and interleaving of different processes.

The connection circuit 36 between the external connection 38 and the data memory 30 is not given special attention in the time diagram shown in FIG. 2. For the apparatus shown in FIG. 1 however, it is assumed that the data memory 30 is a dual-access memory in which data can at least be simultaneously read in two independent addresses. Consequently, an external request for a data word at a given address of data memory 30, arriving from the environment via the line 38, can be executed almost immediately; it will merely be necessary, at least for given technical constructions of the data memory 30, to synchronize it with the internal clock signals CT. However, an instruction originating from the environment via connection 38 in order to write a data word which is also supplied via this connection, at a given address in the data memory, cannot be straightaway executed, one reason would be that a data word read out from a given address and appearing on the connection 31 should not be erased or overwritten during or immediately before reading, by a data word originating from the environment. This would cause unpredictable situations. Therefore, the connection circuit 36 is controlled by the sequence control signal on the connection 13. It is assumed notably that at least for one given sequence control signal no memory within the apparatus shown in FIG. 1 is erased by data originating from this same apparatus, i.e. neither the address memory 14 takes up a new address, nor the data memory 30 or the buffer memory 34 take up a data word present on the connection 33. Thus, within the apparatus practically no function which acts in the future, is executed, i.e. the execution in the apparatus is quasi-arrested. For this particular sequence control signal the connection circuit 36 is enabled so that a data word originating from the environment can be written into the data memory. With this organization no unpredictable disturbances can occur.

DETAILED DESCRIPTION OF A FURTHER PREFERRED EMBODIMENT

Figure 3:
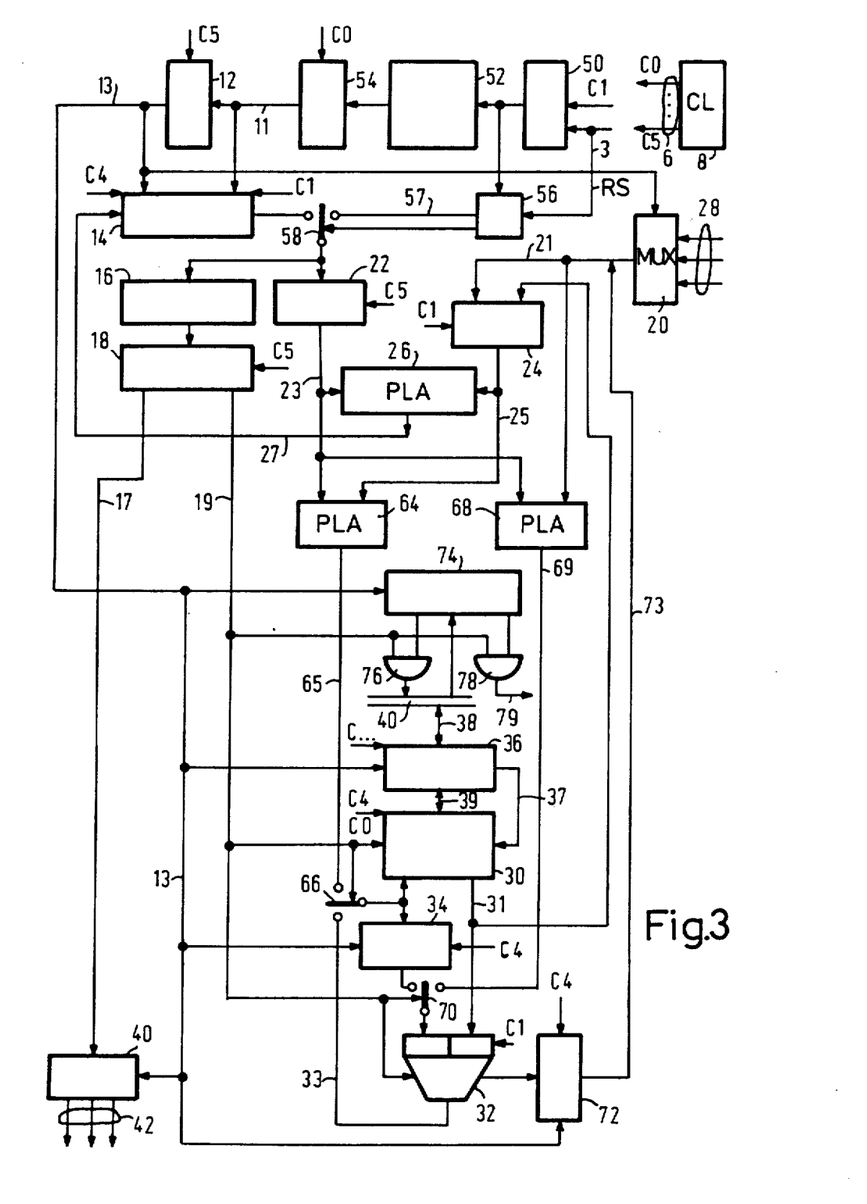
FIG. 3 is a detailed block diagram of a data processing apparatus in accordance with the invention.

The apparatus shown in FIG. 1 comprises only the most important elements. This renders certain necessary functions difficult or even impossible to realize. An apparatus which can operate more flexibly is shown in fig. 3. Elements corresponding to those of FIG. 1 are denoted by the same reference numerals. The sequencer for generating the sequence control signals in the data processing apparatus shown in FIG. 3 consists of a counter 50, a memory 52 which is addressed by the counter, and a further sequence control register 54 which is connected thereto. There is also provided a start logic circuit 56 which sets the start instruction addresses of the instruction memory 16 in response to a reset signal applied via the line 3, for example upon start-up. To this end, the reset signal on the line 3 resets the counter 50 to its starting position and the start logic circuit 56 is set so that it switches the switch 58 to the right-hand position. Then the input of the instruction address register 22 and the address input of the instruction memory 16 are connected to the output 57 of the start logic circuit. The outputs of the counter 50 also control the start logic circuit 56 which generates, for the first counter positions, each time given start addresses. These are defined, for example in a logic circuit or a read-only memory. These start addresses appear successively on output 57 and are written into the instruction address register 22 whose output signals on the connection 23 ensure that the PLA 26 forms initial addresses on the connection 27. The latter addresses may correspond to the start addresses and are successively written into the address memory 14. The time shift then occurring between the position of the counter 50 and the associated sequence control signal on the connection 13 can be taken into account by the relevant start addresses. When an initial address has been stored in the address memory 14 for each one of the different sequence control signals that is to say for each sequence control signal associated with a given process, the number of sequence control signals or processes being fixed, the switch 58 is switched over. Thereupon the input of instruction address register 22 and that of instruction memory 16 are connected to the output of address memory 14.

Thereupon, counter 50 generally addresses the sequence control memory 52 in a cyclically repeated address sequence. Given sequence control signals are being stored at the individual addresses. The capacity of the counter 50 and hence also that of the sequence control memory 52 is larger than the number of different sequence control signals. Thus these signals can be stored in the memory 52 more than once in an arbitrarily selectable sequence. Thus the instructions of the individual processes can also be executed with different occurrence frequencies. The appended table I illustrates an example, i.e. the processing of two different, serial data input/output connections which are denoted by the references SIO and V24, as well as two timer functions which are denoted as timer 1 (TIM 1) and timer 2 (TIM 2). Herein, V24 is a well known serial communication protocol. In table I, the left-hand column shows the positions of the counter 50 and the right-hand column shows the function or process associated with the sequence control signal stored in the memory 52. The empty fields in the right-hand column indicate that no function is executed for the associated sequence control signal, i.e. at these instants a data word from the environment can be written into data memory 30.

Because only four different processes are being executed only four different sequence control signals are required here; these signals can be encoded by means of two bits. The case that no instruction is to be executed or alternatively that writing of a data word from the environment into the data memory 30 is enabled, can be indicated by a third bit. Thus connections 5 and 13 would consist of three bit lines. For one value of the first bit the storage functions, that is to say the writing into address memory 14 and into buffer memory 34 and data memory 30, are inhibited from within the apparatus.

It will be apparent that the sequence of the individual sequence control signals or processes can be chosen arbitrarily by way of corresponding contents of the sequence control memory 52. For simple applications, for example when the apparatus shown in FIG. 3 forms an intelligent interface between a higher-order data processing system and peripheral apparatus, the necessary functions are defined to a high degree and sequence control memory 52 is preferably constructed as a read-only memory. For other applications, however, it may also be constructed as a read/write memory which in given circumstances can be overwritten by a new content; the new content can be supplied by the environment, for example by a higher-order system. It will also be apparent that the capacity of the counter 50 can have arbitrary value. For simple applications it may be fixed. For other applications it may also be adjustable notably under control of the environment.

In the apparatus shown in FIG. 3 the connection 31 which carries data words read from data memory 30 is not connected directly to one input of PLA 26 which generates each time the next instruction address. Instead, it may be connected to a further input of register 24 which is constructed so as to be accordingly larger. There are also provided two further elements 64 and 68 which are also constructed as a PLA, that is to say as combinatory logic networks which produce given data words on outputs 65 and 69, respectively, in reaction to given input signal combinations.

PLA 68 is controlled by the actual instruction address contained in instruction address register 22 and by signals which arrive from the environment via the line or lines 28 selected by the multiplexer 20 and present on the line 21. These signals represent condition signals in the described manner. The output 69 of the PLA 68 is connected to one input of a switch 70 which is controlled by a given bit in the part of the instruction word on the connection 19. This switch feeds one input of the arithmetic and logic element 32. The PLA thus enables, for given data words and notably in dependence of external condition signals, the direct supply of data words to arithmetic and logic element 32. No program branch needing several instruction steps is now required.

Similarly, PLA 64 is controlled by the current instruction address present in the instruction register 22 and output via the connection 23, and by the content of the register 24 which is output via the connection 25. The output connection 65 of the PLA 64 is connected to one input of a switch 66 which is also controlled by a given, other bit of the instruction word part on the connection 19. The switch applies the data word generated by the PLA 64, instead of the data word output by the arithmetic and logic element 32 via the connection 33, notably to the data input of the data memory 30, for writing therein. Subsequently, this data word can be output to the environment via connection circuit 36 and the connection 38. In reaction to certain instructions, PLA 64 can thus record a data word output on the connection 31. This may be effected in dependence of condition signals received on connection 21, so that it can be processed more readily or more directly by a higher-order data processing system connected to external connection 38.

Each of the two inputs of arithmetic and logic element 32 is preceded by a register which is represented as a small block and which takes over the applied data words at a given instant, as will be explained hereinafter, before forming the logic combination operation. This is attractive for many technical realizations of the data memory 30 and the buffer memory 34, because the data words on the input of the register preceding arithmetic and logic element 32 may thus disappear already before the arithmetic and logic element 32 has produced the result and before this result has been stored.

In addition to the data word on the connection 33, the arithmetic and logic element 32 also generates control signals which indicate, for example, a range overshoot and which are applied to the input of a further memory 72 which is referred to as a flag memory and which is also addressed by the sequence control signals. Such control signals of the arithmetic and logic element 32 are customarily used for possible program branches. Therefore, the output of flag memory 72 is connected to an input of register 24 via the connections 73 and 21.

The signals on output lines 42, being connected, for example to peripheral apparatus, are derived, as in the apparatus shown in FIG. 1, from a part of the instruction word on the connection 17, via a demultiplexer 40 which couples the connection 17 to a line or group of lines 42 under the control of the sequence control signals.

In the present embodiment, the connection 38, being connected to the environment via the connection circuit 36, is connected to a bus 40 which forms part of a higher-order data processing system and which supplies the connection 38 with inter alia control signals and address signals which identify the connection circuit 36. These indicate the addresses to be read or written in the data memory 30. The bus also applies data words to be written or read thereto. Furthermore, bus 40 may apply an interrupt signal, generated by an AND-element 76. To this end, there is also provided a set of registers 74 which are controlled by the sequence control signals on the connection 13. A control register is provided for each one of the various sequence control signals. Information can be written therein via the bus 40. One input of the AND-element 76 is connected to the output of the control register selected by the sequence control signal. Its other input receives a given bit of the instruction word part on the connection 19. Thus, when the relevant instruction bit has been set for an instruction during execution of a given process and the associated control register contains predetermined information at the same time, an interrupt signal will be applied to the higher-order data processing system via bus 40. The higher-order data processing system can thus determine when it will accept an interrupt signal and for which process.

The set of registers 74 addressed by the sequence control signal also includes further registers, referred to as stop registers, in which information can be written via the bus 40. When such information is present in a stop register selected by the sequence control signal, it is applied to one input of a further AND-element 78. The other input thereof is controlled by a further bit of the instruction word part on the connection 19. When this bit has a given value, the output 79 will supply a signal which inhibits the writing of a new address in the address memory 14, and possibly also the writing of data words in the data memory 30 and the buffer memory 34, for the relevant sequence control signal, that is to say for the relevant process. As a result, the higher-order data processing system can stop a selected process at a predetermined point. This process will continue only when the information is erased or when other information is written in the relevant register of the set of registers 74 via the bus 40.

DESCRIPTION OF THE TIME-SEQUENTIAL EXECUTION

In contradistinction to FIG. 1, clock generator 8 generates six different, successive clock signals C0 to C5. Notably the generating of the sequence control signals requires a plurality of processing steps. However, this does not cause slow-down, as will be explained with reference to FIG. 4. Now, processing takes place at three levels shifted in time with respect to one another. During execution of an instruction shown in the lower block of fig. 4, the next instruction is prepared in the middle block, the latter instruction belonging to another process. At the same time the next sequence control signal but one is generated in the upper block.

Figure 4:
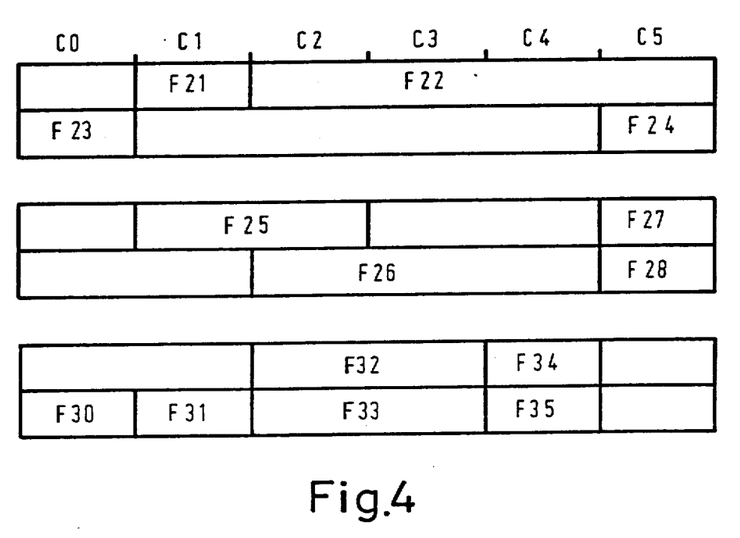
FIG. 4 is a diagram illustrating the time sequence and interleaving of the processes in the apparatus shown in FIG. 3.

This is realized in that the second clock signal C1 of the first cycle advances the counter 50 one position in function step F21. During the clock signals C2 through C5, the sequence control signal stored at this address in sequence control memory 52 is read in function step F2. This signal is written into register 54 during the second cycle by the clock signal C0 in function step F23, so that it appears on connection 11. In reaction to the clock signals C1 and C2 of this second cycle the next instruction address is thus read from the address memory 14 in function step F25, so that in reaction to the clock signals C2 to C4 the corresponding instruction is read from instruction memory 16 in function step F26. Using the last clock signal C5 of the second clock cycle, the address read from address memory 14 is written into the instruction address register 22 in function step F27 and in function step F28 the instruction read is written into instruction register 18. Furthermore, in function step F24 the sequence control signal present on connection 11 is written into register 12, that is to say one clock period before the next sequence control signal is written into register 54. Thus, when the first clock signal C0 of the third cycle appears, the instruction word will be present on the connections 17 and 19 so that the data memory 30 will be addressed and read in function step F30. Moreover, the PLA 68 then receives its valid input signals, that is to say the current instruction address on connection 23 and the condition signals on connection 21, while buffer memory 34 and flag memory 72 are controlled by function control signal thus validated. Consequently, in reaction to the next clock signal C1 in function step F31 the registers preceding the two inputs of arithmetic and logic element 32 take over the applied data word and, moreover, in register 24 the condition signals present on connection 21 are written and also the data word read from data memory 30 and present on the connection 31.

In reaction to the next two clock signals C2 and C3, PLA 26 can generate, in function step F32, the next instruction address for this process on the connection 27. In function step F33 arithmetic and logic element 32 can combine the two data words applied, the result being output on connection 33. In reaction to the next clock signal C4, in function step F34 the next instruction address, present on connection 27 is written into address memory 14. The input address is determined by the sequence control signal on connection 13. In function step F35 a control signal possibly generated by the arithmetic and logic element 32 is written into the flag memory 72 and the data word generated on the connection 33 is written into the buffer memory 34 and possibly in the data memory 30 when switch 66 is in its lower position. When switch 66 occupies its upper position, the data word generated by the PLA 64 on the connection 65 is written into the data memory 30, because the inputs of the PLA 64 are still valid; the content of the programm address register 22 is changed only in reaction to the clock signal C5 as indicated for the function step 27. Thus, the individual instructions are executed in a triple time-interleaved form.

DESCRIPTION OF THE CONNECTION CIRCUIT

The elements used in the apparatus shown in the FIGS. 1 and 3, for example, memories, registers or PLAs, have a known construction which need not be elaborated. Merely the connection circuit 36 which notably synchronizes the applied signals and the clock signals within the apparatus shown in FIG. 1 and FIG. 3 will be described with reference to FIG. 5.

Figure 5:
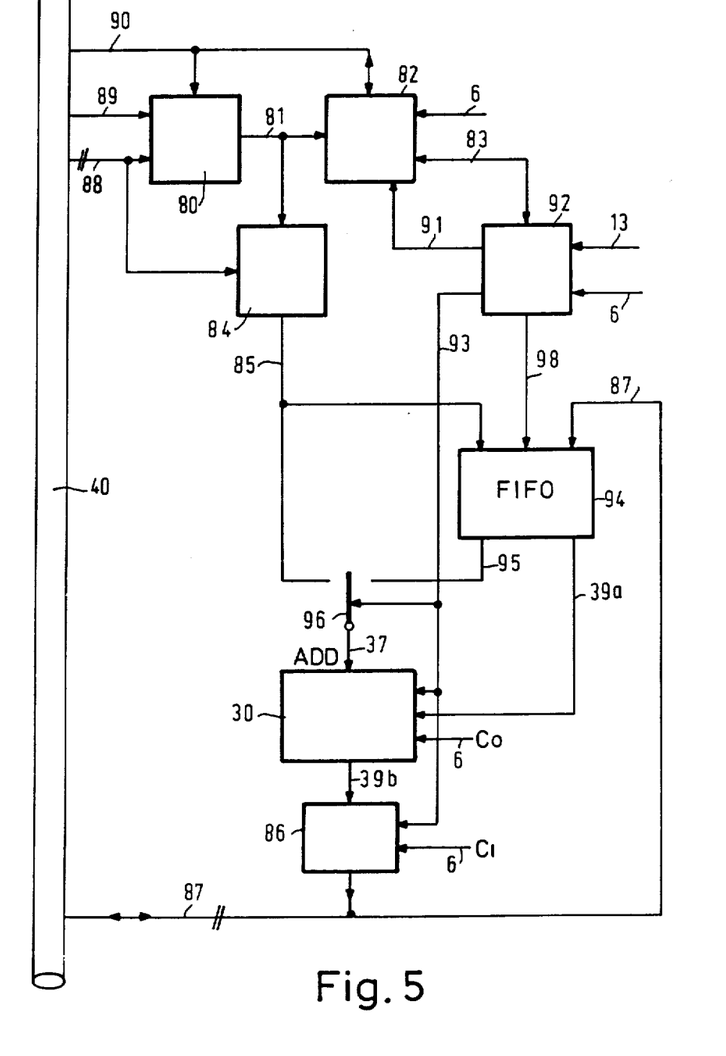
FIG. 5 is a block diagram of a connection circuit for the data memory.

In FIG. 5 the connection 38 to the bus 40 of FIG. 3 includes a data connection 87 which comprises a plurality of parallel lines and which can output or receive a data word in parallel, a connection 88 which also includes a number of parallel lines via which an address is applied to the connection circuit, as well as control lines 89 and 90 via which the control signals such as validity signals, read/write control signals, acknowledge signals and possibly clock signals are transmitted.

The more significant address bits of the address supplied in parallel via connection 88 are applied to an address decoder 80 which also receives, via line 89, a validity signal when the address signals have become stable. Via connection 90 a clock signal is applied. When address decoder 80 determines that the address transmitted by the higher-order data processing system via bus 40 is indeed intended for the connection circuit 36, address decoder 80 generates a control signal on the line 81. This controls address buffer 84 which stores the less-significant address bits, as well as synchronization circuit 82 in which the external clock signals applied via the connection 90 and the internal clock signals C6 are synchronized and further control functions are initiated.

For a read operation in data memory 30 the more significant address bits activate decoder 80 to control, via a signal on the line 81, address buffer 84 to store the less-significant address bits which indicate the address in data memory 30 wherefrom the data word is to be read. This address subsequently appears on the connection 85.

Via the line 90 there is also applied a read control signal which is applied, via synchronisation circuit 82 and connection 83, to FIFO control circuit 92 which controls a FIFO memory 94 for temporarily taking-up data words. The read/write control signal is applied via the control circuit 92, because it must be combined with further signals for a write operation as will be explained hereinafter. For a read operation, the control circuit 92 generates a read control signal immediately on line 93.

This signal sets switch 96 to its left-hand position, so that the address present on the connection 85 is applied, via connection 37, to the external address input of data memory 30. The data memory 30 then immediately executes a read operation under the control of the clock signal CO as has been explained for step F30 in FIG. 4. The data word read at the separate data output 39b is written into data buffer 86 under control of clock signal C1. Thus, this word is available on connection 87 connected to the bus 40 no later than at the beginning of the subsequent clock signal C2. Using this clock signal, synchronization circuit 82 generates an acknowledge signal on connection 90, provided that the address was available before the clock signal CO. Thus, a plurality of data words can be read in direct succession, if the read requests on bus 40 succeed one another sufficiently quickly.

For a write operation in memory 30, the address is applied in the same manner and the write control signal is applied to FIFO control circuit 92 via connection 83. Furthermore, via connection 87 the data word to be written is applied. The output of data buffer 86 is controlled in a high-ohmic state except i the case of a read instruction. The data word can be written into memory 30 only under control of a corresponding sequence control signal. This may require several cycles of the clock signals CO to C5. Notably when a plurality of data words are to be written in direct succession, the bus 40 would be blocked for a prolonged period of time, because it must keep the data words at least until they have been written. Therefore, there is provided a buffer in the form of a FIFO memory 94 which is capable of storing a plurality of successive data words. Because it is necessary to remember for each data word the intended address, the FIFO memory 94 stores parallel to the data words, the addresses applied via the connection 85.

Thus, upon arrival of the write control signal, the FIFO control circuit 92 immediately activates the FIFO memory 94 via the connection 98, so that the data word on connection 87 is written together with the associated address on connection 85. Depending on the technical construction of the memory 94, it will be necessary to wait for a given clock signal of the clock cycle in the apparatus itself. Upon completion of the write operation in memory 94, an acknowledge signal is output on the connection 90 via the synchronization circuit 82 so that the next data word and the associated address can be applied.

A write signal is generated on line 93 only when the corresponding sequence control signal appears on connection 13, so that the switch 96 is set to the righthand position. Then the address least recently written in FIFO memory 94 and present on connection 95 is applied, via connection 37, to the address input of data memory 30. At the same time, the FIFO memory 94 outputs, via the connection 39a, the data word least recently stored. This word is written into data memory 30 under control of the next clock signal C4.

For the writing of the next data word from the FIFO memory 94, the next appearance of the relevant sequence control signal on the connection 13 is awaited.

The FIFO control circuit 92 monitors whether the FIFO memory 94 still contains data word to be written. When the environment supplies more data words to be written than can presently be stored in FIFO memory 94, the control circuit 92 generates a blocking signal on line 91, thus generating a corresponding signal on connection 90, via the synchronization circuit 82. Then no further data words can be applied for the time being via the bus 40 and the data word applied most recently is sustained.

The described apparatus is particularly suitable for use as an interface between a higher-order processing system and several external serial data or control lines, or which operate quasi-parallel as a result of time-interleaving. The described apparatus can also be used in other applications where several processes are to be simultaneously performed and where no severe requirements are imposed as regards speed. The described apparatus can in principle be adapted to different applications merely by adaptation of the contents of control memories, such as the instruction memory 16 and the sequence control memory 52, and the construction of the PLAs 26, 64 and 68.

The circuits described hereabove on the level of functions to be fulfilled and of the respective block diagrams, can be realised as an integrated circuit in conventional technology.

LIST OF FIGURE REFERENCE NUMERALS

FIG. 1: 16 instruction memory (=program store); 18 instruction register; 32 ALU; 34 buffer memory; 30 data memory, 8: clock generator; 10: sequencer; 12 control register; 14: address memory; 26 programmable logic array; 24 register; 20 multiplexer; 40 demultiplexer, 36 connection circuit; 17, 19, 31, 33 non-bus lines.

FIG. 2: F1: generate sequence control signal; F2: address memory location; F3: read instruction register; F4: write new sequence control signal in register 12; F5: write new instruction address; F6: write new instruction word; F7: select proper line 28; F8: read data word from RAM, for application to PLA 26; F9: generate next instruction address; F10: generate output data word from ALU; F11: store new instruction address; F12: write data word in buffer memory.

FIG. 3: 50: counter; 52: sequencer memory; 54: sequence control register; 56: start logic circuit; 58: switch; 64, 68: programmable logic arrays; 70: switch; 32 ALU plus input registers; 72: flag memory; 76, 78 AND elements; 74: register set; 40: bus.

FIG. 4: F21: advance counter 50; F22: read sequence control signal; F23: write sequence control signal in register 54; F24: write sequence control signal in register 12; F25: read instruction address; F26: read instruction memory 16; F27: write into address register 22; F28: write instruction into register 18; F30: address and read data memory and input PLA 64; F31: take-over data words into ALU input registers; F32: generate next instruction address; F33: combine two data words in ALU; F34: write next instruction address into address memory 14; F35: write control signal into flag memory and store processing result from ALU.

FIG. 5: 80: decoder more significant address bits; 84: decoder less significant address bits 82: synchronization circuit; 92: FIFO control circuit 94; FIFO-store; 86: data buffer.

TABLE I

| COUN . . . 50 | PROC . . . |
|---|---|
| 0 | |
| 1 | TIM 1 |
| 2 | SIO |
| 3 | V24 |
| 4 | TIM 2 |
| 5 | |
| 6 | V24 |
| 7 | TIM 1 |
| 8 | |
| 9 | SIO |
| 10 | TIM 2 |
| 11 | |
| 12 | V24 |
| 13 | TIM1 |
| 14 | |
| 15 | SIO |
| 16 | TIM 2 |
| 17 | |
| 18 | V24 |
| 19 | TIM 1 |
| 20 | |
| 21 | SIO |
| 22 | TIM 2 |
| 23 | |
| 24 | V24 |
| 25 | TIM 1 |
| 26 | |
| 27 | SIO |
| 28 | TIM 2 |
| 29 | V24 |

What is claimed is:

1. An integrated circuit data processing apparatus for time-interleaved quasi-parallel execution of a plurality of processes, said apparatus comprising:

a clock for generating a sequence of multi-pulse clock cycles, each cycle having a sequencer-controlling pulse;

a sequencer under control of said sequencer-controlling clock pulse for recurrently stepping through a set of sequence control signals stored therein, each different sequence control signal corresponding to a different process;

an instruction memory having a plurality of addressable locations for storing a set of instructions;

an address memory for storing a plurality of instruction memory addresses for addressing said instruction memory locations, said address memory having an address input and a control input for receiving said sequence control signals, said address memory outputting an instruction memory address under control of a sequence control signal and a first address received on said address input;

said instruction memory having an input for receiving an instruction memory address from said address memory and means for outputting an instruction stored in the addressed location;

an instruction register receiving the output of said instruction memory for storing an instruction received from said instruction memory, and said instruction register having an output;

an address generator receiving addresses from said address memory and having further condition/data inputs for generating said first address of a set of addresses stored therein for forwarding to said address input of said address memory a next following instruction memory address;

an arithmetic and logic element having two data inputs and having a first control input for receiving control signals from said instruction register for under control of a current control signal executing a combining operation on two words received on said data inputs and a data output for outputting the result of said combining operation;

a buffer memory having a data input for receiving the result from said data output of said arithmetic and logic element and for storing said result, said buffer memory having a data output for feeding a predetermined one of said two data inputs of said arithmetic and logic element, said buffer memory having a plurality of memory locations each addressable by a corresponding sequence control signal and having an address input for receiving said sequence control signals from said sequence under control of at least a part of said sequence control signal for accessing a corresponding memory location;

a data memory having a plurality of addressable memory locations and an address input connected to the output of said instruction register responsive to part of an instruction from said instruction register for addressing a data memory location, a data input for receiving the result from said data output of said arithmetic and logic element and a data output for feeding the other one of said two data inputs of said arithmetic logic unit;

a first dedicated connector for connecting said data memory to said instruction register and a second dedicated connector for connecting said buffer memory to said instruction register;

a bidirectional connection circuit means having a control input for receiving sequence control signals from said sequencer, said connection circuit means being bidirectionally connected between said data memory and an external connection under control of a further part of said sequence control signal for controlling a data exchange between said data memory and the external connection.

2. An integrated circuit data processing apparatus as claimed in claim 1, wherein said connector circuit means comprises an output selector for selectively forwarding an instruction signal from said instruction register or external output signal.

3. A data processing apparatus as claimed in claim 1, further comprising:
said arithmetic and logic element having a control output (carry, zero crossing, or change of sign); and
a flag memory having a plurality of memory locations addressable by the sequence control signals, the number of different memory locations being determined by the number of different sequence control signals, and an output for supplying at least one condition signal to said data/condition input of said buffer register.

4. A data processing apparatus as claimed in claim 1, further comprising: a buffer register preceding said data inputs of the arithmetic and logic element and said data/condition signal input of the address generator, said buffer register storing any applied data immediately after the reading of either said data memory or of said buffer memory.

5. A data processing apparatus as claimed in claim 1, wherein said apparatus further comprises:
a first read-only memory addressed in parallel by the content of said instruction address register, by data read from said data memory and by at least one condition signal; and a first switch controlled by an output of the instruction register, said first switch having a first position such that said buffer memory data input and said data memory data input are fed by the output of said first read-only memory and a second position such that said data memory and buffer memory data inputs are fed by said arithmetic and logic element.

6. An integrated circuit data processing apparatus as claimed in claim 1, wherein said connection circuit means comprises an input selector for selectively forwarding an external input signal or condition signal to said address generator.

7. A data processing apparatus as claimed in claim 6, wherein said input selector is a multiple multiplexer which is controlled by the sequence control signals and which derives at least some sequence control signals from condition signals on input lines of one of a plurality of groups of input lines feeding said multiplexer, each group of input lines being associated with a different sequence control signal, and said output selector for the instruction word being a multiple demultiplexer controlled by the sequence control signals and which connects at least some outputs of the instruction memory register to output lines of one of a plurality of groups of output lines, each group being associated with a different sequence control signal.

8. A data processing apparatus as claimed in claim 1, further comprising:
a second read-only memory addressed in parallel by the content of the instruction address register and by a condition signal; and
A second switch controlled by another output of the instruction register having a first position such that said predetermined one of said two data inputs of said arithmetic and logic element is fed by said data output of said data memory and a second position such that the other of said two data inputs of said arithmetic and logic element is fed by said buffer memory data output.

9. A data processing apparatus as claimed in claim 8, wherein the connection circuit means comprises a data connection circuit connected to the data memory for accessing said data memory only under control of control signals supplied from outside the apparatus, said data connection circuit comprising means for synchronizing said control signals with the clock signals of the clock generator and with sequence control signals; and said sequencer generating a predetermined sequence control signal for inhibiting the writing of data from the arithmetic and logic element or from the first read-only memory into the data memory.

10. A data processing apparatus as claimed in claim 9, wherein the synchronization circuits comprises a buffer memory for storing the data to be written which are applied to the connection circuit from the environment and the associated addresses for supply to the data memory under the control of the clock signals and the sequence control signals.

11. A data processing apparatus as claimed in claim 9, wherein the data memory is constructed as a dual-access memory having separate address inputs and separate data outputs, and two arbitrary addresses from which data can be read, in a time-independent manner for output on.

12. A data processing apparatus as claimed in claim 9, wherein for the quasi-simultaneous control of a plurality of input/output apparatus operations for a higher-order data processing system, the data processing system is connected to the data connection circuit the input/output apparatus being connected to further parts of the connection circuit means for the condition signals or the instruction word.

13. A data processing apparatus as claimed in claim 12, further comprising:
- a set of registers which comprises a plurality of control registers which correspond to the number of different sequence control signals, said control registers being accessible by the higher-order data processing system and each register being associated with another sequence control signal; and
- a logic circuit for generating an interrupt control signal for the higher-order data processing system when during a given sequence control signal the associated control register and at the same time a predetermined output of said instruction register carry predetermined values.

14. A data processing apparatus as claimed in claim 12, wherein said set of registers further comprises a plurality of stop registers corresponding to the number of different sequence control signals, said stop registers being accessible by the high-order data processing system and being associated with a respective sequence control signal; and
- a second logic circuit for generating a signal which inhibits the writing of data in said address storage memory, data memory, and buffer memory when the associated stop register and a predetermined output of the instruction register simultaneously carry predetermined values during a given sequence control signal.

15. An integrated circuit data processing apparatus as claimed in claim 1, further comprising:
- said clock having a plurality of clock outputs each for a respective clock pulse of said multi-pulse clock cycle;
- an instruction address register connected between said address memory and said address generator;
- said address memory having first and second control inputs for receiving sequence control signals;
- a sequence control register for storing a sequence control signal received from said sequencer having an output connected to said address memory, said buffer memory and said bidirectional connection circuit means;
- said sequencer having an output connected to said sequence control register and said first control input of said address memory;
- said sequencer being connected to a first clock output, and in response to a first clock pulse of a clock cycle received from said first clock output, said sequencer generating a sequence control signal corresponding to a next process, the memory location in the data memory addressed by the instruction register being read for supplying one of said data inputs of said arithmetic and logic element and said address generator, and the memory location of the buffer memory addressed by the output of the sequence control register being read for supplying the other of said data inputs of said arithmetic and logic element, said addressed locations of said buffer and data memories corresponding to a current process;
- in response to a second clock pulse, said arithmetic and logic element processing said supplied data associated with the current process for outputting the result on said arithmetic and logic element output, said address generator generating a next instruction address corresponding to a current process, and said address memory being addressed by said sequence control signal corresponding to said next process for reading a new address for the instruction memory;
- said address memory, buffer memory and data memory each having an input connected to a third clock output and upon receiving a third clock pulse said address memory storing said next instruction address for the current process at a memory location corresponding to the current process, said result on the output of said arithmetic and logic element being stored in the buffer memory at the location addressed by the sequence control signal stored in said sequence control register, and the instruction associated with said next process being read from said instruction memory; and
- said sequence control register, said instruction register and said instruction address register each having an input connected to a last clock output of said plurality of clock outputs for upon receiving a last clock pulse in a cycle storing, respectively, the sequence control signal, the instruction, and the instruction address each corresponding to said next process.

16. A data processing apparatus as claimed in claim 6, wherein the sequencer comprises a sequence counter whose capacity equals at least a predetermined maximum number of different sequence control signals, and a sequence control memory addressed by the sequence counter and which contains different sequence control signals in respective memory locations.

17. A data processing apparatus as claimed in claim 16, wherein the capacity of the sequence counter is adjustable.

18. A data processing apparatus as claimed in claim 16, wherein
- said sequence counter has a clock input connected to said second clock output and in response to a said second clock pulse said sequence counter generates a sequence control signal and said sequence control memory stores said sequence control signal; and
- said sequencer comprises a further sequence control register having a clock input connected to said first clock output for storing said sequence control signal from said sequence control memory upon receipt of a first clock pulse of said multi-pulse clock cycle.

19. A data processing apparatus as claimed in claim 16, wherein the sequence control memory is electrically modifiable.

20. A data processing apparatus as claimed in claim 19, wherein said apparatus further comprises:
- a first read-only memory which is addressed in parallel by the content of the said instruction address register, by data read from the said data memory and by at least one condition signal; and
- a first switch controlled by an output of said instruction register, said first switch having a first position such that said buffer memory data input and said data memory data input are fed the output data of said first read-only memory and a second position such that said data memory and buffer memory data inputs receive said result from said arithmetic and logic element.

21. A data processing apparatus as claimed in claim 20, wherein said apparatus further comprises:
- a second read-only memory addressed in parallel by the content of the instruction address register and by a said condition signal; and
- a second switch controlled by another output of the instruction register having a first position such that said predetermined one of said two data inputs of said arithmetic and logic unit receives said data output of said data memory and a second position such that the other of said two data inputs of said arithmetic and logic unit receives the output of said buffer memory data output.

22. A data processing apparatus as claimed in claim 21, further comprising a buffer register preceding said data inputs of said arithmetic and logic element and said data/condition signal input of said address generator, said buffer register storing any applied data immediately after the reading of either said data memory or of said buffer memory.

23. A data processing apparatus as claimed in claim 22, wherein
- said sequence counter has a clock input connected to said second clock output, and in response to a said second clock pulse said sequence counter generates a sequence control signal and said sequence control memory stores said sequence control signal; and
- said sequencer comprises a further sequence control register fed by said sequence control memory, said further sequence control register having a clock input connected to said first clock output for storing said sequence control signal from said sequence control memory upon receipt of a first clock pulse of said multi-pulse clock cycle.

24. A data processing apparatus as claimed in claim 23, wherein the connection circuit means comprises a data connection circuit connected to the data memory for accessing said data memory only under control of control signals supplied from outside the apparatus, said data connection circuit comprising synchronizing means for synchronizing said control signals with the clock signals of the clock generator and with sequence control signals and said sequencer generating a predetermined sequence control signal for inhibiting the writing of data from the arithmetic and logic element or from the first read-only memory into the data memory.

25. A data processing apparatus claimed in claim 24, wherein the synchronization means comprises a buffer memory for storing the data to be written which are applied to the connection circuit from the environment and the associated addresses for supply to the data memory under the control of the clock signals and the sequence control signals.

26. A data processing apparatus as claimed in claim 25, wherein said data memory is a dual-access memory comprising separate address inputs and separate data outputs, and two arbitrary addresses to which data can be applied via said separate address inputs and from which data can be read in a time-independent manner for output on said separate data outputs.

27. A data processing apparatus as claimed in claim 26, wherein for the quasi-simultaneous control of a plurality of input/output apparatus operations for a higher-order data processing system, the data processing system is connected to the data connection circuit and the input/output apparatus is connected to further parts of the connection circuit means for communicating the condition signals or the instruction word.

28. A data processing apparatus as claimed in claim 27, further comprising:
- a set of registers which comprises a plurality of control registers which correspond to the number of different sequence control signals, said control registers being accessible by the higher-order data processing system and each register being associated with another sequence control signal; and
- a logic circuit for generating an interrupt control signal for the higher-order data processing system when during a given sequence control signal the associated control register and at the same time a predetermined output of said instruction register carry predetermined values.

29. A data processing apparatus as claimed in claim 28, wherein said set of registers further comprises a plurality of stop registers corresponding to the number of different sequence control signals, said stop registers being accessible by the high-order data processing system and being associated with a respective sequence control signal; and
- a second logic circuit for generating a blocking signal which inhibits the writing of data in said address storage memory, data memory, and buffer memory when the associated stop register and a predetermined output of the instruction register simultaneously carry predetermined values during a given sequence control signal.

* * * * *